No. 669,089. Patented Mar. 5, 1901.
J. C. LAMBERT.
MOVABLE VEHICLE SEAT
(Application filed July 10, 1900.)
(No Model.) 2 Sheets—Sheet 1.
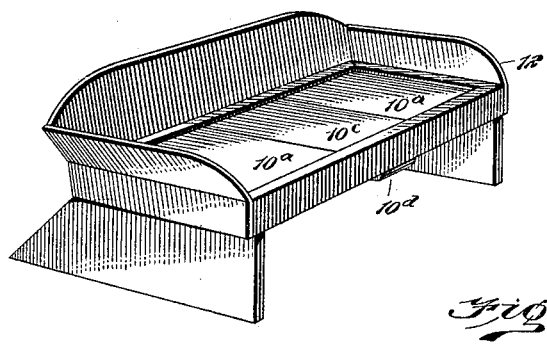
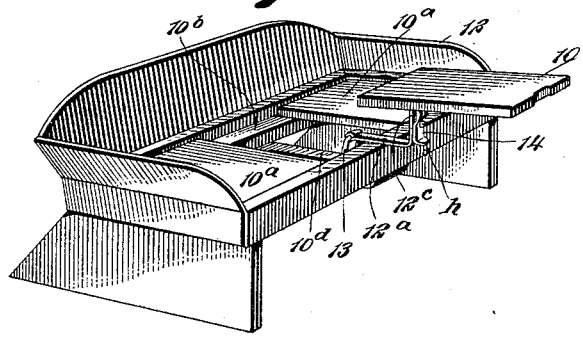
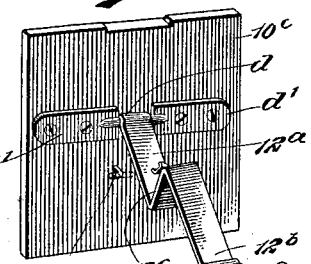
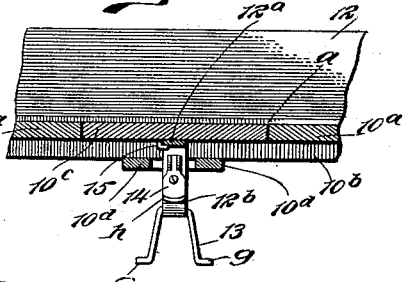
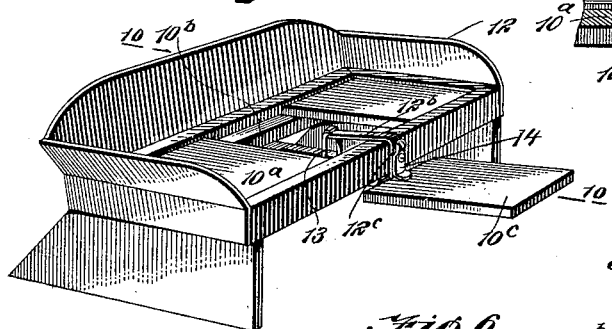
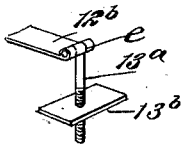
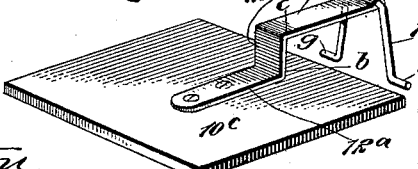
WITNESSES:
H. G. Dieterich
Wm P. Patton
INVENTOR
John. C. Lambert.
BY
ATTORNEYS
THE NORRIS PETERS CO., PHOTO-LITHO., WASHINGTON, D. C.

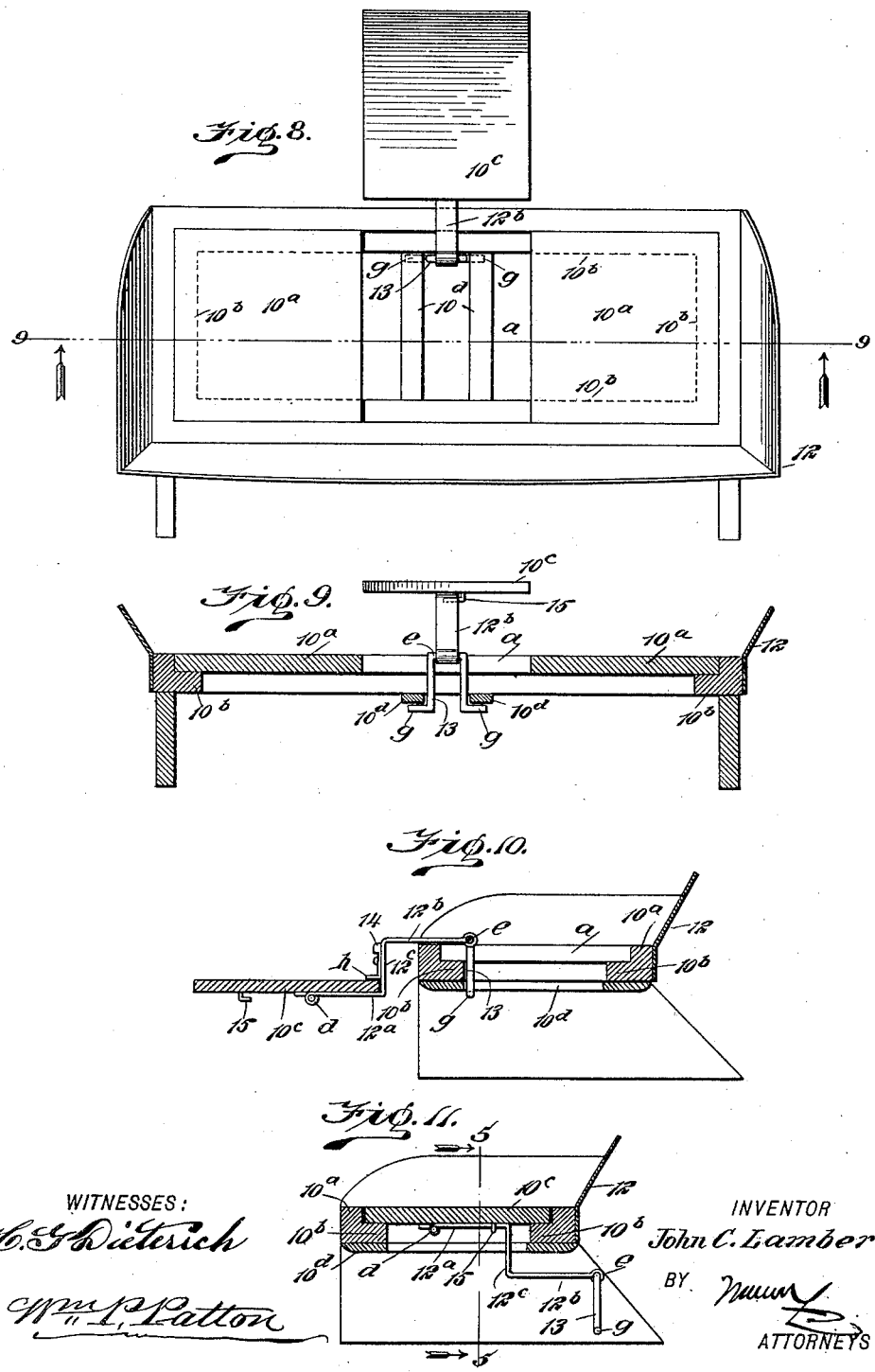

UNITED STATES PATENT OFFICE.

JOHN CALVIN LAMBERT, OF TONICA, ILLINOIS.

MOVABLE VEHICLE-SEAT.

SPECIFICATION forming part of Letters Patent No. 669,089, dated March 5, 1901.

Application filed July 10, 1900. Serial No. 23,071. (No model.)

*To all whom it may concern:*

Be it known that I, JOHN CALVIN LAMBERT, a citizen of the United States, and a resident of Tonica, in the county of La Salle and State of Illinois, have invented a new and Improved Movable Vehicle-Seat, of which the following is a full, clear, and exact description.

This invention relates to seats for vehicles, such as buggies or other passenger-conveyances, that usually have but a single seat, which is capable of holding two persons comfortably, and has for its object to provide a third seat for such vehicles, which is normally located in a central aperture in the main seat, but is adjustable to locate it at the front of said main seat opposite the aperture therein, thus accommodating a third passenger with a seat, so positioned as to avoid crowding the other occupants of the vehicle.

The invention consists in the novel construction and combination of parts, as is hereinafter described, and defined in the claims.

Reference is to be had to the accompanying drawings, forming a part of this specification, in which similar characters of reference indicate corresponding parts in all the figures.

Figure 1 is a perspective view of a vehicle-seat having the improvements adjusted to carry them upon and below the main seat. Fig. 2 is a similar view showing the adjustable seat held projected at the front of said main seat and adjusted to elevate it above the main seat-board. Fig. 3 is a similar view showing the adjustable seat held projected at the front of said main seat in a plane below its seat-board. Fig. 4 is a perspective view of the adjustable seat removed from the main vehicle-seat and also showing the novel device for connecting said seat with the main seat-frame. Fig. 5 is an enlarged longitudinal sectional view of a portion of the main vehicle-seat and of the improvements thereon, taken substantially on the line 5 5 of Fig. 11. Fig. 6 is an inverted perspective view of the adjustable seat and of a modified means for adjustably connecting said seat with the frame of the main seat. Fig. 7 is a perspective view of a modified form of the means for connecting the adjustable seat with the main seat. Fig. 8 is a plan view of the improvement in position for use on a main seat. Fig. 9 is a section on the line 9 9 in Fig. 8, showing the connection of the adjustable seat with the frame members of the main seat. Fig. 10 is a transverse sectional view substantially on the line 10 10 in Fig. 3, showing the position of parts when the adjustable seat is below and in advance of the main seat; and Fig. 11 is a transverse sectional view showing the relative position of parts when the adjustable seat is located in the opening in the main seat.

In the drawings which illustrate the invention and its application, 12 indicates a vehicle-seat of the usual form, adapted for location transversely on the body of a buggy or any other passenger-conveyance which is ordinarily adapted to comfortably seat but two passengers. The seat-board $10^a$ of the vehicle-seat 12 is imposed, as usual, upon the ledges $10^b$, which are held on the inner side of the seat-body, as usual, and at an equal distance from each side of the seat-body a rectangular opening $a$ is formed in the seat-board $10^a$.

A board $10^c$, which is the seat proper of the adjustable seat, is provided and has such dimensions and shape as will adapt it to neatly fit in the opening $a$, and when in place the front and rear edges thereof rest upon the middle portions of the ledges $10^b$. The means for adjustably and removably holding the seat-board $10^c$ projected from the frame of the main seat, in front of the opening $a$ therein, comprises the following details: On the ledges $10^b$ two cross-bars $10^d$ are secured at their ends and suitably spaced apart, these cross-bars being positioned at or near the center of the main seat below the opening $a$ in the seat-board $10^a$. A metal bracket, preferably of flat material, is formed with two right-angular bends $b\,c$ near its longitudinal center, said bends being spaced apart by the short intermediate member $12^c$, and from the bends $b\,c$ two members $12^a\,12^b$ project oppositely, as shown in Figs. 4 and 6. The member $12^a$ of the arm is held by one end upon one side of the seat-board $10^c$, at the transverse center of the latter. The engaged member $12^a$ of the arm may either be firmly affixed upon the lower side of the seat-board $10^c$, as shown in Fig. 6, or be loosely connected therewith, as represented in Fig. 4. The loose connection consists of a short pintle $d$, having a flat leaf $d'$ extended at each end, said leaves being held transversely on the under side of the seat-board, near its center of length, by screws, as shown in Fig. 4. At the free end of the opposite member $12^b$ of the bracket a loop 13 is held to rock thereon by a hinge-joint $e$, and, as shown, the loop is substantially U-shaped and has a horizontal journal from which depend two similar limbs that at their lower ends are bent outward and oppositely in the same plane, thus providing hook ends $g$. Upon the short intermediate member $12^c$ of the bracket a turn-button 14 is pivoted, having a foot $h$ thereon at one end, which by adjustment over the adjacent transverse edge of the seat-board $10^c$ will bear thereon and lock the board against rocking movement at the hinge-joint $e$, this provision only being necessary when the bracket is loosely engaged at one end with the under side of the seat-board $10^c$, near its central portion.

In Figs. 5 and 11 it will be seen that when the adjustable seat-board $10^c$ is located in the opening $a$, so as to become a part of the main seat-board $10^a$, the member $12^c$ may be extended down between the cross-bars $10^d$ and then folded rearwardly, and the member $12^b$ be projected below and at the rear of the main seat-frame. To hold the bracket thus disposed, a rockable finger-piece 15 is provided and is pivoted on the seat-board $10^c$, adjacent to the member $12^a$ of the bracket, and by proper adjustment is hooked over said member $12^a$, which will bind said member $12^a$ upon the seat-board, so as to prevent it from swinging loosely thereon, this adjustment being clearly shown in Fig. 5.

To arrange the additional seat for use, the seat-board $10^c$ is removed from the frame of the main seat, and the loop 13 is passed down between the cross-bars $10^d$ and then turned, so as to project the hook members $g$ below the cross-bars. This adjustment will in case the loop is moved toward the front edge of the main seat-frame dispose the member $12^b$ across the front bar of the main seat-frame at its longitudinal center and rest it thereon, the length of the short member $12^c$ being so proportioned that the seat-board $10^c$ will be held level and projected in advance of the main seat by the engagement of the hooks $g$ upon the under side of the cross-bars $10^d$, as represented in Figs. 8, 9, and 10.

The adjustment of parts, as shown in Figs. 2, 8, and 9, projects the member $12^c$ of the bracket upward, so that the seat-board $10^c$ is disposed in a plane above the main seat-board $10^a$ and parallel therewith, this arrangement of the additional seat-board $10^c$ adapting it for carrying a grown person, such as a tall driver, while the main seat is occupied by persons of less stature, who are in no way incommoded by the seat-board $10^c$, as free space is afforded beneath and at each side of the same by the disposal of the additional seat, as represented in Fig. 2. In Figs. 3 and 10 the additional seat is represented as adjusted to project the seat-board from the main seat in a plane below the main seat-board $10^a$ and parallel with it. To effect this adjustment of parts, the bracket is rocked on the pintle $d$, so as to cause the member $12^a$ of said bracket to have contact with the portion of the seat-board $10^c$ rearward of said pintle, and the rockable turn-button 14 is adjusted so as to bear upon the upper side of the seat-board $10^c$, at the rear edge thereof, which will hold the bracket secured against rocking movement on the seat-board. The member $12^b$ of the bracket is now imposed on the front bar of the main seat-frame at its longitudinal center after the depending loop 13 is hooked beneath the spaced cross-bars $10^d$, and, as shown in Fig. 3, this will hold the additional seat extended from the main seat-frame in advance of and below the main seat-board $10^a$, which adapts the improved seat for use by a person of short stature or by a child.

As previously stated, the improved vehicle-seat is readily disposed in connection with the main seat, so as to adapt the additional seat-board $10^c$ to become a part of the main seat-board $10^a$, and the attachments on the additional seat are held beneath the main seat, so as to be fully concealed from view, as clearly shown in Fig. 11, the additional seat being quickly adjustable for service, as occasion may require.

The means for effecting a hooked connection between the member $12^b$ of the bracket and the cross-bars $10^d$ of the seat-frame 12 may be modified as in the construction shown in Fig. 7, if this is preferred, and, as shown, this modification consists in hinging one end of an eyebolt $13^a$ upon the free end of the member $12^b$ and screwing a plate $13^b$ upon the threaded portion of said bolt. In use the plate $13^b$ catches below the cross-bars $10^d$ and detachably secures the bracket to said cross-bars. The plate being adjustable on the bolt facilitates the leveling of the seat-board $10^c$ on the seat-frame 12.

Having thus described my invention, I claim as new and desire to secure by Letters Patent—

1. The combination with a main seat having a single hole at the center of its seat-board, of an additional seat comprising a single board which will fill the hole in the main seat-board, and a device adapted to support said additional seat in a plane above or below the plane of the main seat-board.

2. The combination with a main seat apertured in its seat-board, of an additional seat, the seat-board of which is adapted to fill the aperture in the main seat-board, and a bent bracket connected with the additional seat-board and removably engaged with members of the main seat-frame.

3. The combination with a main seat-frame, and two spaced cross-bars near the center of said seat-frame, and a main seat-board formed with an aperture above said cross-bars, of an additional seat, comprising a seat-board adapted to fill the aperture in the main seat-board when not used as an additional seat, a bent bracket securable by one end on one side of the additional seat-board and projectable over an edge thereof, and a hinged piece hung from the projecting end of the bent bracket, having opposite lugs or hook members projecting laterally and adapted to engage the lower sides of the cross-bars of the main frame, and hold the bracket and seat projected at the front of the main seat-frame.

4. In a device of the character described, the combination with the additional seat-board, of the bent bracket having two main members held parallel and spaced apart by an intermediate short member, joined to the main members by right-angular bends, a hooking-piece loosely hung on a projectable end of one member of the bracket, and a rockable connection between the outer end of the opposite member of the bracket and one side of the seat-board.

5. In a device of the character described, the combination with the additional seat-board, of the right-angular bent bracket having two main members spaced apart in parallel planes by a short intermediate member, a hinged piece having lugs or hooking members on its ends, a turn-button on the intermediate member of the bracket, adapted to bear upon an edge of the seat-board, and means for securing the other members of the bracket on the seat-board.

6. In a device of the character described, the combination with the additional seat-board, of the right-angular bent bracket having two main members spaced apart in parallel planes by a short intermediate member, a hinge-joint between one end of said bracket and one side of the seat-board, and a rockable finger-piece on the seat-board, adapted to be projected over a folded member of the bracket and prevent the bracket from swinging on its joint.

In testimony whereof I have signed my name to this specification in the presence of two subscribing witnesses.

JOHN CALVIN LAMBERT.

Witnesses:
GEO. D. HILTABRAND,
WINFIELD J. EBNER.